No. 787,170. PATENTED APR. 11, 1905.
F. H. GLEW.
INSTRUMENT FOR RENDERING VISIBLE THE LUMINOUS EFFECTS PRODUCED BY RADIO-ACTIVE SUBSTANCES.
APPLICATION FILED NOV. 30, 1904.
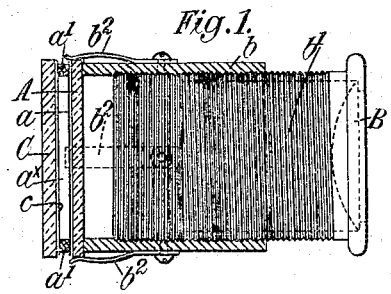
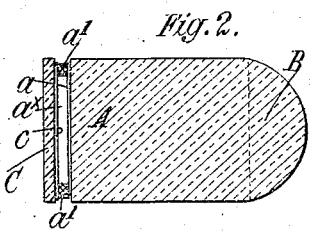
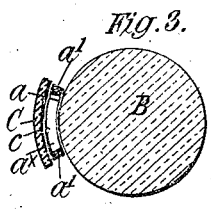
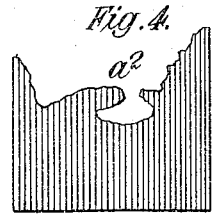
Witnesses:
P. F. Nagle.
L. Douville.
Inventor:
Frederick Harrison Glew.
By Wiedersheim & Fairbanks
Attorneys.

No. 787,170.

Patented April 11, 1905.

UNITED STATES PATENT OFFICE.

FREDERICK HARRISON GLEW, OF LONDON, ENGLAND.

INSTRUMENT FOR RENDERING VISIBLE THE LUMINOUS EFFECTS PRODUCED BY RADIO-ACTIVE SUBSTANCES.

SPECIFICATION forming part of Letters Patent No. 787,170, dated April 11, 1905.

Application filed November 30, 1904. Serial No. 234,863.

*To all whom it may concern:*

Be it known that I, FREDERICK HARRISON GLEW, radiographer, a subject of the King of Great Britain, residing at 156 Clapham road, London, England, have invented certain new and useful Improvements in Instruments for Rendering Visible the Luminous Effects Produced by Radio-Active Substances, of which the following is a specification.

This invention relates to instruments for rendering visible the luminous effects produced by radio-active substances.

Certain instruments, known as "spinthariscopes," have already been devised in which the radio-active rays of such substances as radium are permitted to impinge upon the active surface of a fluorescent or phosphorescent opaque screen, the visible effects thus produced by the radio-active rays being observed through a suitable lens situated in front of the active surface of the screen upon which the radio-active rays impinge and on the same side thereof as the substance from which the said radio-active rays emerge. I find that a greatly-increased sensitiveness of the instrument can be obtained by using a fluorescent or phosphorescent screen that is transparent and by placing said screen between the lens or point of observance and the radio-active substance, so that said lens will be situated on the side of the screen opposite to that upon which the radio-active rays impinge. In my improved instrument, therefore, the luminosity produced by the radio-active rays striking the fluorescent or phosphorescent surface of the transparent screen is observed through the said screen instead of in front of it.

In order that my said invention may be clearly understood and readily carried into effect, I will describe the same more fully with reference to the accompanying drawings, in which—

Figure 1 is a longitudinal section of a preferable form of my apparatus. Figs. 2 and 3 are sections of a modified form of the apparatus. Fig. 4 is an elevation of a stencil which may be used with the apparatus as hereinafter described.

A is the transparent screen-body, and *a* the fluorescent or phosphorescent surface thereof. B is the lens, and C is the body carrying the radio-active substance *c*, the luminous emanations of which are to be observed. In Fig. 1 the said screen is made independent of the lens and eyepiece and is detachably connected with the casing *b*, in which the eyepiece *b'*, carrying said lens, is adjustable for focusing purposes. For thus detachably connecting said screen with the lens-casing I have shown the latter provided with resilient fingers $b^2$, which are adapted to grip the opposite edges of the screen-body A between them with sufficient firmness to maintain the same in place. Other means may, however, be employed for thus detachably connecting the said sensitive screen with the lens-casing. The body C, carrying the radio-active substance *c*, is in this example composed of a flat piece of cardboard or glass. The screen-body A is composed of glass, mica, celluloid, or similar transparent substance coated on one side only with any suitable adhesive and transparent substance—such as glue, seccotine, shellac, or Canada balsam—and then while the coated surface is in a semifluid state I allow the phosphorescent or fluorescent substance to fall thereon in a powdered condition from a sieve. These particles of powder become wholly or partly embedded in the adhesive substance and are so held in position when the adhesive substance becomes dry or set. The phosphorescent or fluorescent substance I prefer to use is phosphorescent sulfid of zinc, fluorescent willemite, or natural silicate of zinc in fine powder or fine crystals; but I may use any other suitable phosphorescent or fluorescent substance as and for the purpose described. The radio-active substance *c* to be examined is preferably placed very near to or actually in contact with the coated surface of the aforesaid transparent sensitive screen A and may be so held in position against the sensitive screen either mechanically or by any adhesive substance. In this way a flat piece of pitch-blende can be seen by the aid of my apparatus to be radio-active. I prefer, however, to use the pitch-blende in a powdered condition applied, by means of some suitable adhesive substance, such as glue, to the supporting surface or body C, which may consist of a piece of cardboard or glass. The application of the powdered radio-active substance to the body C may be effected in an analogous manner to that of the phosphorescent or fluorescent powder to the screen-body A. Any other radio-active substance may be used instead of the pitch-blende, such as polonium or radium or their compounds or preparations, either in solution or in the solid or gaseous state. The glass or other body C, with its coating or surface of radio-active substance, when placed in close proximity to or in contact with one of my sensitive transparent screens may be connected with the same and used like a microscopic slide. In order to keep the radio-active surface of the body C and the sensitive transparent screen at the proper distance apart, I may employ adhesive strips $a'$ of paper or other material of any size or shape, which will also serve as the means for connecting the said body C and sensitive transparent screen together, as aforesaid. The radio-active body C and the sensitive transparent screen may be of any size or shape, and the space $a^x$ between their active surfaces may contain air or any suitable gas or vapor or may be in a vacuuous condition. In the examples shown in the annexed drawings this space is sufficient to permit of the insertion of stencils, as hereinafter described.

In the modification shown by Fig. 2 the lens and the screen are made integral—that is to say, the lens comprises a cylindrical piece or body portion of solid glass or any optical equivalent which is convex at one end to form the lens B and more or less flat at the other end to form the transparent surface or body to which the fluorescent or phosphorescent substance $a$ is applied to constitute the sensitive screen. The radio-active body or coated plate C is arranged relatively to said surface $a$ in an analogous manner to that described with reference to Fig. 1.

In Fig. 3 the lens and screen are also made integral; but in this instance the part B comprises a sphere instead of a flat and convex-ended cylinder like that shown in Fig. 2. The transparent screen is obtained by applying the fluorescent or phosphorescent substance $a$ at any convenient part of the sphere, and the radio-active body or coated plate C is made curved in correspondence with the curved surface of this coated portion $a$ of the sphere. In other respects this form of the apparatus is similar to that of the others illustrated in the previous figures.

The arrangements illustrated in Figs. 2 and 3 are especially suitable where cheapness in production is of consideration.

For obtaining certain artistic or spectacular effects any suitably-cut stencil, such as that shown in Fig. 4, may be inserted in the space $a^x$; between the radio-active and phosphorescent surfaces $a$ and $c$ to limit the area of visible scintillations to some required pattern. In Fig. 4 the stencil is supposed to be made of paper, with the upper part cut to the outline of a landscape picture, the clear open space $a^2$ corresponding to the outline of the sky of the picture. When such a stencil is placed in the space $a^x$, the observer sees an imitation of shooting stars or a pyrotechnic display in the sky-space only. A variety of stencils may be provided for insertion at will into the aforesaid space $a^x$. A permanent effect of the kind produced by the use of any of the stencils may be obtained by coating a particular stencil on one side with some adhesive substance and placing the same in contact with either the screen-body A or the radio-active body C, or both sides of the stencil may be coated with adhesive substance and placed between and in contact with the parts A and C to make a permanent attachment together of all the parts.

Instead of using a stencil of the kind referred to above a design or picture may be painted in ordinary pigments, either on the sensitive surface of the transparent screen or upon the radio-active surface of the body C, or part of the design or picture may be painted on one and the remainder on the other of these surfaces, or the radio-active body may be mixed with varnish or adhesive gum and then painted on the sensitive transparent screen in any required pattern.

The lens B may be of any suitable shape or focal length to suit the observer, so that a focusing arrangement may be dispensed with in cases where a selection can be made by the observer.

Although I have found it advantageous to make my said apparatus as a self-contained device, as shown in the drawings, I may, if desired, make the lens or eyepiece, the sensitive transparent screen, and the radio-active body separate from each other. These various parts could then be adapted to fit into a suitable case or box for conveniently keeping them together when not in use.

What I claim, and desire to secure by Letters Patent of the United States, is—

1. The combination of an eyepiece or lens, a radio-active substance, and a transparent and fluorescent or phosphorescent screen interposed or situated between the eyepiece or lens and the said radio-active substance with its fluorescent or phosphorescent surface directed toward or facing the same for the purpose specified.

2. The combination of an eyepiece or lens, a radio-active substance, a transparent body provided with a sensitive surface of fluorescent or phosphorescent material interposed or situated between the eyepiece or lens and the said radio-active substance with its sensitive surface directed toward or facing the same for the purpose specified.

3. The combination of an eyepiece or lens, a body provided with a radio-active surface, a transparent body interposed or situated between the eyepiece or lens and the said radio-active body and provided with a sensitive surface of fluorescent or phosphorescent material on the side facing the radio-active body, and means for connecting together said radio-active and sensitive bodies with a space between them substantially as and for the purpose described.

4. The combination of an adjustable eyepiece or lens, a body provided with a radio-active surface, a transparent body interposed or situated between the eyepiece or lens and the said radio-active body and provided with a sensitive surface of fluorescent or phosphorescent material on the side facing the radio-active body, means for connecting together said radio-active and sensitive bodies with a space between them, and means for detachably connecting said radio-active and sensitive bodies to the eyepiece or lens substantially as and for the purpose described.

5. The combination of an adjustable eyepiece or lens, a body provided with a radio-active surface, a transparent body interposed or situated between the eyepiece or lens and the said radio-active body and provided with a sensitive surface of fluorescent or phosphorescent material on the side facing the radio-active body, means for connecting together said radio-active and sensitive bodies with a space between them and resilient fingers on the said adjustable eyepiece or lens for detachably connecting the said radio-active and sensitive bodies to the eyepiece or lens substantially as and for the purpose described.

6. The combination of an eyepiece or lens, a body provided with a radio-active surface, a transparent body interposed or situated between the eyepiece or lens and the said radio-active body and provided with a sensitive surface of fluorescent or phosphorescent material on the side facing the radio-active body, means for connecting together said radio-active and sensitive bodies with a space between them, and a stencil adapted to lie within said space for the purpose specified.

In testimony whereof I have hereunto set my hand, in presence of two subscribing witnesses, this 15th day of November, 1904.

FREDERICK HARRISON GLEW.

Witnesses:
T. SELBY WARDLE,
WALTER J. SKERTEN.